US011800362B2

(12) United States Patent
Agarwal et al.

(10) Patent No.: US 11,800,362 B2
(45) Date of Patent: Oct. 24, 2023

(54) METHODS AND APPARATUS TO ESTIMATE PERFORMANCE OF A RADIO LINK IN A WIRELESS COMMUNICATIONS SYSTEM

(71) Applicant: QUALCOMM Incorporated, San Diego, CA (US)

(72) Inventors: Ravi Agarwal, San Diego, CA (US); Gavin Bernard Horn, La Jolla, CA (US); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 17/096,122

(22) Filed: Nov. 12, 2020

(65) Prior Publication Data

US 2021/0153025 A1  May 20, 2021

Related U.S. Application Data

(60) Provisional application No. 62/935,458, filed on Nov. 14, 2019.

(51) Int. Cl.
| | |
|---|---|
| *H04W 12/12* | (2021.01) |
| *H04W 12/122* | (2021.01) |
| *H04W 68/00* | (2009.01) |
| *H04W 76/11* | (2018.01) |
| *H04W 12/10* | (2021.01) |
| *H04W 12/03* | (2021.01) |

(52) U.S. Cl.
CPC ......... *H04W 12/122* (2021.01); *H04W 12/03* (2021.01); *H04W 12/10* (2013.01); *H04W 68/005* (2013.01); *H04W 76/11* (2018.02)

(58) Field of Classification Search
CPC ... H04W 12/122; H04W 12/03; H04W 12/10; H04W 68/005; H04W 76/11; H04W 24/10; H04W 12/61
USPC .......................................................... 726/26
See application file for complete search history.

(56) References Cited

U.S. PATENT DOCUMENTS 9,462,499 B2 * 10/2016 Shen ................. H04W 36/0085
10,986,519 B2 * 4/2021 Kunz .................... H04W 48/20
(Continued)

FOREIGN PATENT DOCUMENTS

| EP | 3487258 A1 * | 5/2019 | ............ H04W 12/04 |
| JP | 2021100248 A * | 7/2021 | ........... H04L 63/123 |

(Continued)

OTHER PUBLICATIONS

International Search Report and Written Opinion—PCT/US2020/060360—ISA/EPO—dated Feb. 24, 2021.

*Primary Examiner* — Saleh Najjar
*Assistant Examiner* — Peiliang Pan
(74) *Attorney, Agent, or Firm* — Harrity & Harrity, LLP

(57) ABSTRACT

Certain aspects of the present disclosure provide techniques for estimating performance of a radio link in a wireless communication systems using historical information. Disclosed methods generally includes determining receipt of historical information from a network, and estimating the performance of a radio link based on at least one selected from the group consisting of determining historical information was not received, and comparing received historical information to information available at the UE.

42 Claims, 8 Drawing Sheets

(56) References Cited

U.S. PATENT DOCUMENTS

| | | | |
|---|---|---|---|
| 2009/0239533 A1* | 9/2009 | Somasundaram | H04W 48/16 455/434 |
| 2011/0310753 A1* | 12/2011 | Chou | H04W 48/16 370/252 |
| 2013/0095789 A1* | 4/2013 | Keevill | H04W 12/062 455/411 |
| 2013/0188576 A1* | 7/2013 | Chao | H04L 1/0009 370/329 |
| 2015/0271194 A1* | 9/2015 | Szucs | H04W 12/06 726/23 |
| 2016/0044531 A1* | 2/2016 | Papa | H04W 28/0289 370/230 |
| 2016/0205660 A1* | 7/2016 | Ryu | H04W 68/02 455/458 |
| 2016/0309332 A1* | 10/2016 | Norrman | H04W 24/08 |
| 2016/0381545 A1* | 12/2016 | Wang | H04W 12/128 455/434 |
| 2018/0359700 A1* | 12/2018 | Sasanapuri | H04W 24/10 |
| 2019/0141632 A1* | 5/2019 | Larsson | H04W 52/0216 |
| 2020/0145859 A1* | 5/2020 | Nair | H04W 36/08 |
| 2020/0288313 A1* | 9/2020 | Kunz | H04W 12/06 |
| 2020/0383080 A1* | 12/2020 | Sharma | H04W 74/004 |
| 2021/0112444 A1* | 4/2021 | Papa | H04W 28/0289 |
| 2021/0211296 A1* | 7/2021 | Muhanna | H04L 9/3242 |
| 2021/0385800 A1* | 12/2021 | Harada | H04L 5/0048 |

FOREIGN PATENT DOCUMENTS

| | | |
|---|---|---|
| KR | 20180007915 A | 1/2018 |
| WO | WO-2018182482 A1 * | 10/2018 |

* cited by examiner

TRANSMITTING HISTORICAL INFORMATION, WHEREIN THE HISTORICAL INFORMATION IS ASSOCIATED WITH ESTIMATING THE PERFORMANCE OF A RADIO LINK BY A UE AND THE HISTORICAL INFORMATION CORRESPONDS TO AN INDICATION OF INFORMATION ASSOCIATED WITH THE UE

METHODS AND APPARATUS TO ESTIMATE PERFORMANCE OF A RADIO LINK IN A WIRELESS COMMUNICATIONS SYSTEM

CLAIM OF PRIORITY UNDER 35 U.S.C. § 119

The present Application for Patent claims priority to Provisional Application No. 62/935,458 entitled "METHODS AND APPARATUS TO ESTIMATE PERFORMANCE OF A RADIO LINK IN A WIRELESS COMMUNICATIONS SYSTEM USING HISTORICAL INFORMATION" filed Nov. 14, 2019 and assigned to the assignee hereof and hereby expressly incorporated by reference herein.

BACKGROUND

Field of the Disclosure

Aspects of the present disclosure relate to wireless communications, and more particularly, to methods and apparatus for improving communications by estimating performance of a radio link e.g. by detecting false base stations and false base station transmissions in a wireless communications system.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. As the global demand for mobile broadband access continues to increase, there exists a need for further improvements in wireless telecommunications, including improved security.

BRIEF SUMMARY

The systems, methods, and devices of the disclosure each have several aspects, no single one of which is solely responsible for its desirable attributes. Without limiting the scope of this disclosure as expressed by the claims, which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a node. The method generally includes determining receipt of historical information from a network, and estimating the performance of a radio link based on at least one selected from the group consisting of determining historical information was not received, and comparing received historical information to information available at the UE.

Certain aspects of the present disclosure provide a method for wireless communication that may be performed by a network entity. The method generally includes transmitting historical information, wherein the historical information is associated with estimating the performance of a radio link by a UE and the historical information corresponds to an indication of information associated with the UE.

Aspects generally include methods, apparatus, systems, computer readable mediums, and processing systems, as substantially described herein with reference to and as illustrated by the accompanying drawings.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
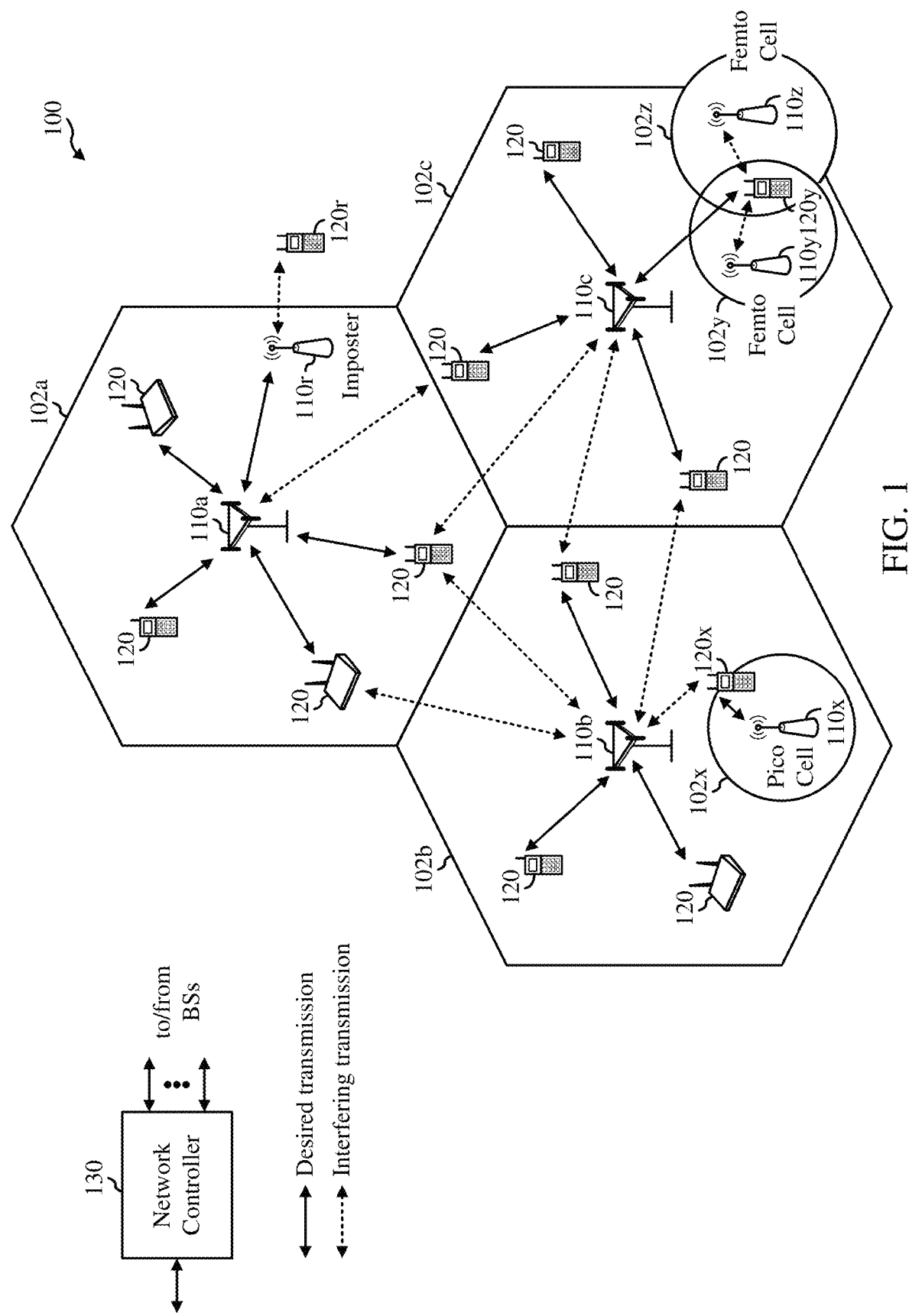
FIG. 1 is a block diagram conceptually illustrating an example telecommunications system, in accordance with certain aspects of the present disclosure.

Aspects of the present disclosure provide apparatus, methods, processing systems, and computer readable mediums for improving communications in wireless communication systems by estimating performance of a radio link including by detecting false base stations and false base station transmissions.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless network 100 in which aspects of the present disclosure may be performed. For example, the wireless network 100 have nodes (e.g., UE 120, BS 110) that may perform operations and procedures to estimate performance of a radio link e.g. detect false base stations and transmissions therefrom.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, 4G or NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include one or more imposter base stations (also referred herein as a false base station). As used herein, a false base station refers to a base station that receives or detects a transmission of data and/or other information from an upstream station (e.g., a BS or a UE) and sends a transmission of the data and/or other information to a downstream station (e.g., a UE or a BS) posing as BS 110a of wireless network 100.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS. The exemplary dashed line between false base station or Imposter 110r and UE 120r illustrates an example of an altered transmission from a legitimate base station 110a to UE 120r.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
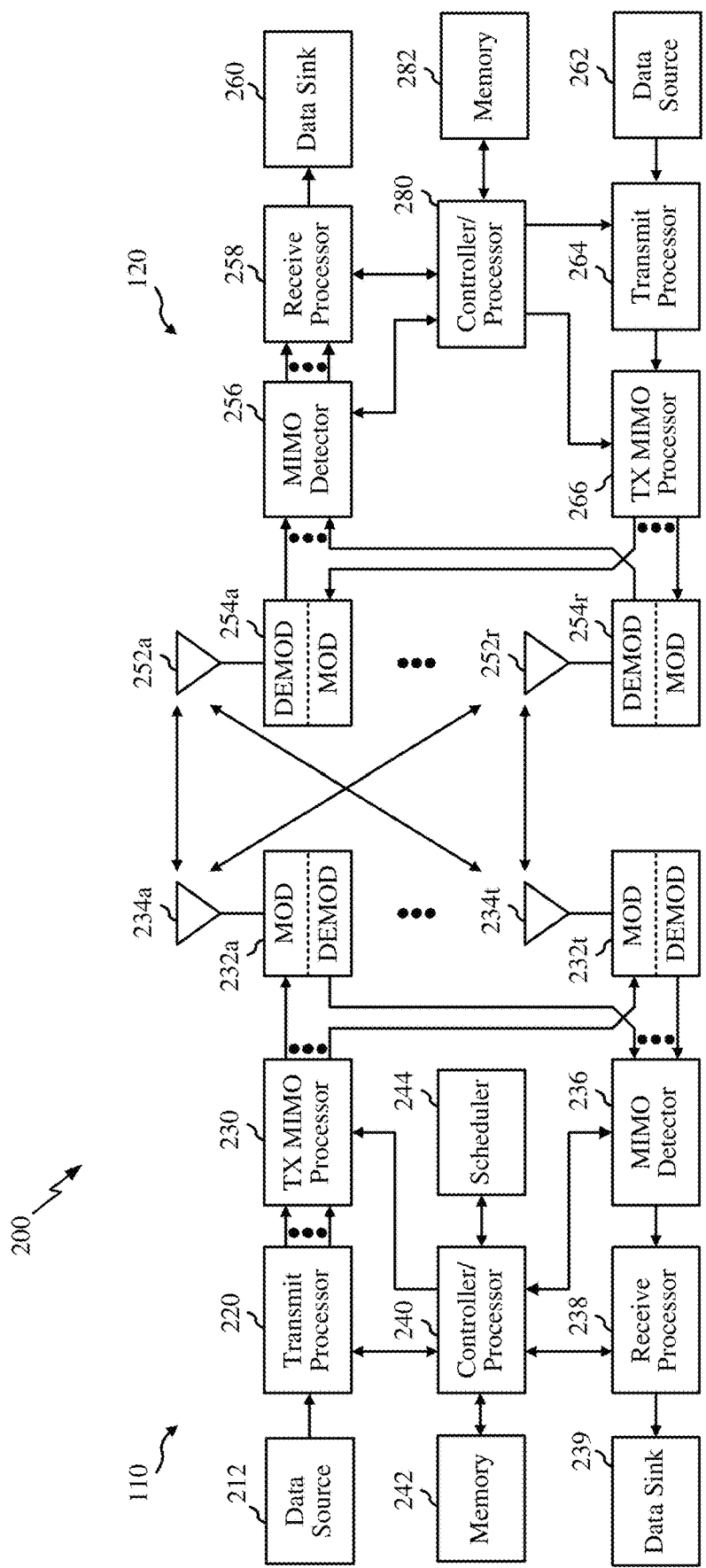
FIG. 2 is a block diagram conceptually illustrating a design of an example BS and user equipment (UE), in accordance with certain aspects of the present disclosure.

FIG. 2 illustrates example components of the BS 110 and UE 120 illustrated in FIG. 1, which may be used to implement aspects of the present disclosure. The BS may include a TRP. One or more components of the BS 110 and UE 120 may be used to practice aspects of the present disclosure. For example, antennas 252, Tx/Rx 254, processors 266, 258, 264, and/or controller/processor 280 of the UE 120 and/or antennas 234, processors 220, 230, 238, and/or controller/processor 240 of the BS 110 may be used to perform the operations described herein and illustrated with reference to FIGS. 5-6 and 10-11.

FIG. 2 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 234a through 234t, and the UE 120 may be equipped with antennas 252a through 252r.

At the base station 110, a transmit processor 220 may receive data from a data source 212 and control information from a controller/processor 240. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the Physical Uplink Shared Channel (PUSCH)) from a data source 262 and control information (e.g., for the Physical Uplink Control Channel (PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the base station 110 and the UE 120, respectively. The processor 240 and/or other processors and modules at the base station 110 may perform or direct, e.g., the execution of the functional blocks illustrated in various figures, and/or other processes for the techniques described herein. The processor 280 and/or other processors and modules at the UE 120 may also perform or direct, e.g., the execution of the corresponding/complementary processes for the techniques described herein and as illustrated in various figures. The memories 242 and 282 may store data and program codes for the BS 110 and the UE 120, respectively. A scheduler 244 may schedule UEs for data transmission on the downlink and/or uplink.

Figure 3:
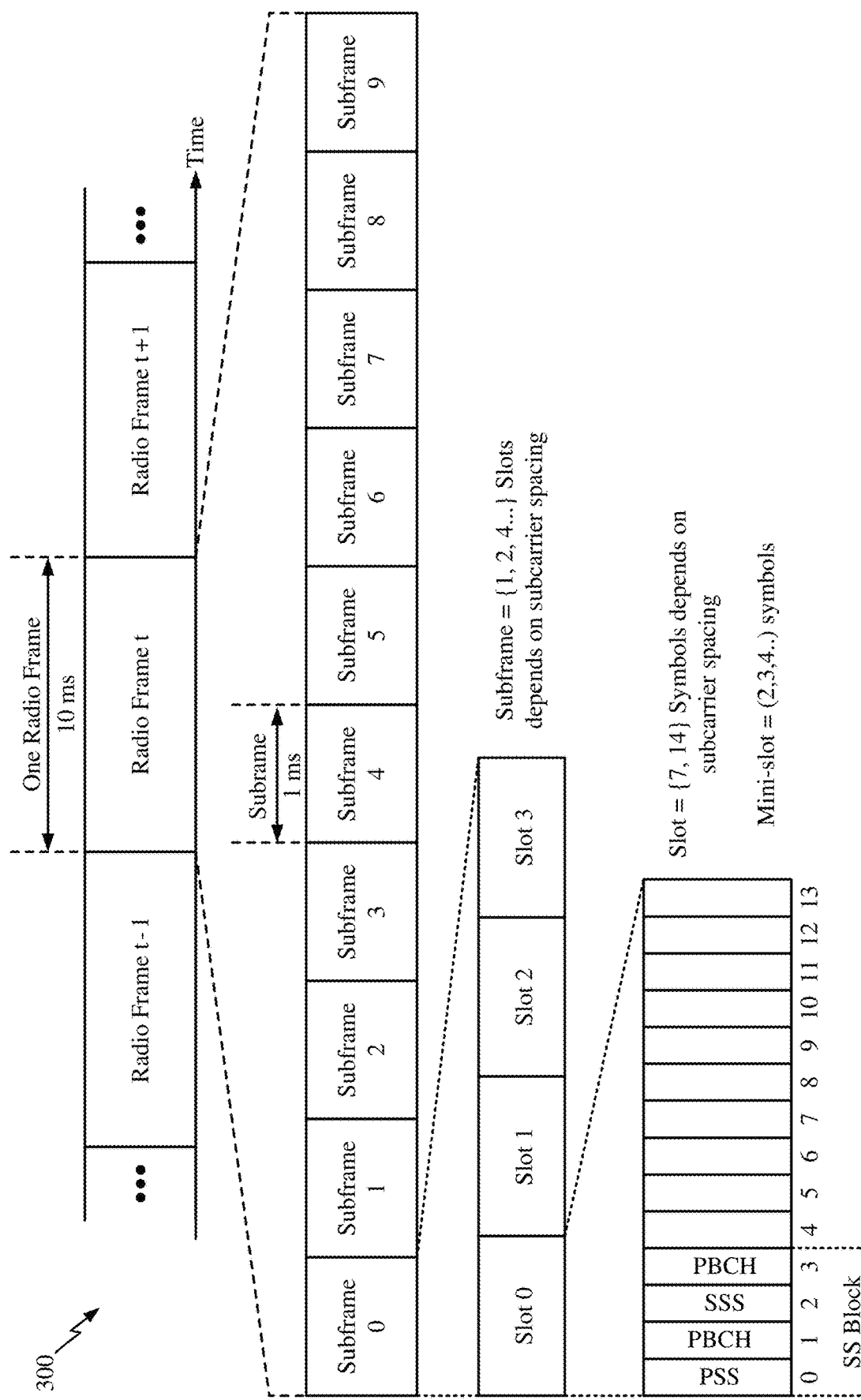
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. In some cases, these signals are examples of the types of signals that a false base station might fake in order to pose as a legitimate BS. The false base station may also fake other types of downlink transmissions (e.g., PDCCH, PDSCH) when posing as a legitimate BS.

The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example False Base Station Detection

Certain aspects of the present disclosure are generally directed to procedures for estimating performance of a radio link e.g. detecting false base stations and false base station transmissions. As described above, a false base station (e.g., Imposter 110r in FIG. 1) is a base station that may eavesdrop on a legitimate BS (e.g., BS 110 in FIG. 1), mimic (pose) as the legitimate BS to a UE (e.g., UE 120 in FIG. 1) and alter the transmission from the legitimate BS. Techniques disclosed herein allow for the detection of false base stations and transmissions therefrom, which may prevent attacks to the UE.

Figure 4:
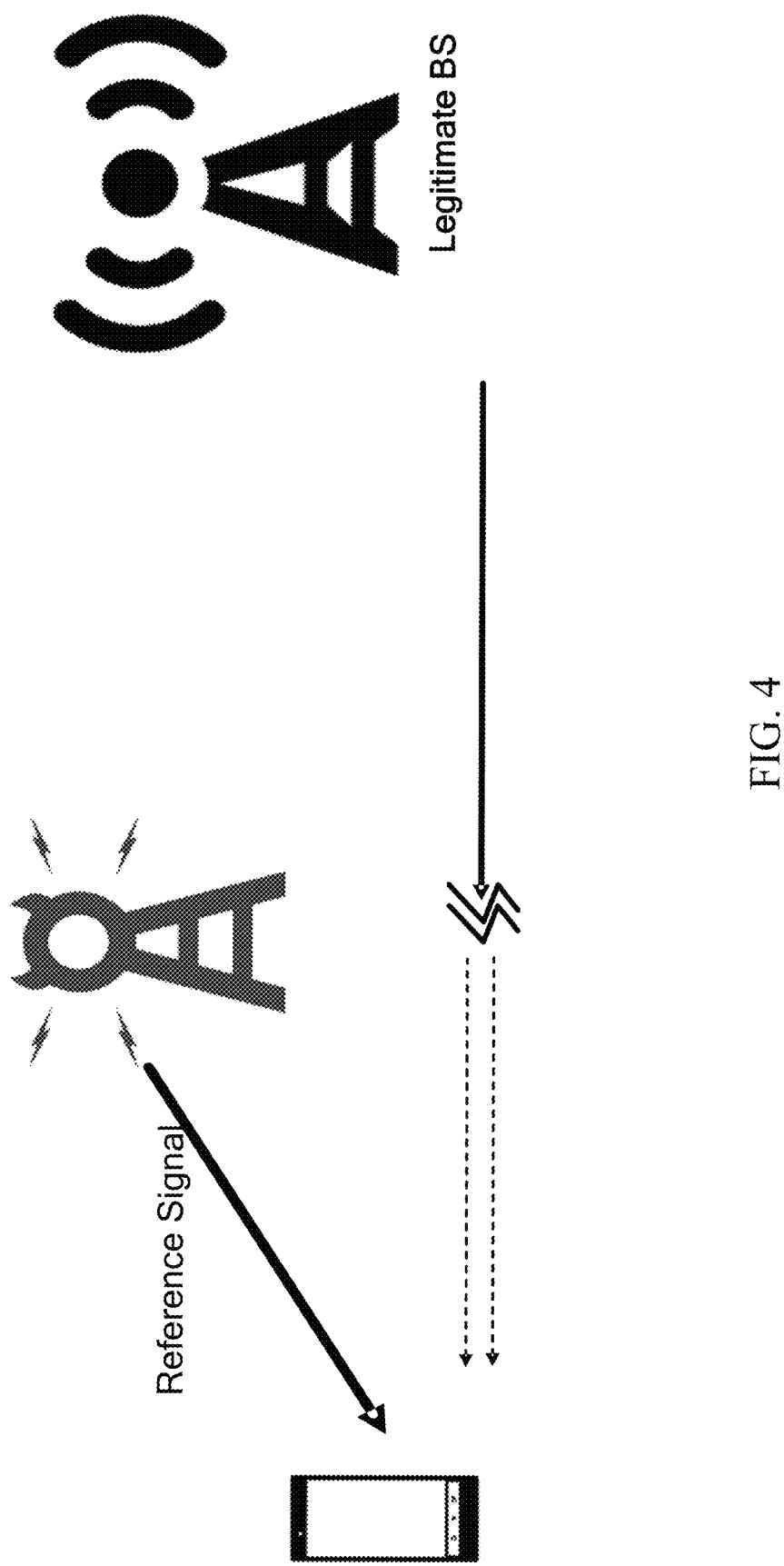
FIG. 4 illustrates an example false (imposter) base station.

As illustrated in FIG. 4, when posing as a legitimate BS to the UE, the false base station may send downlink transmissions (e.g., reference signals and/or channels and/or downlink messages) to the UE that can fool the UE into thinking the downlink transmissions are from the legitimate BS. In this manner, the false base station can attack the UE at a physical layer, and can potentially dupe application layer software.

Vulnerabilities may be specific to a control channel e.g. a Physical Downlink Control Channel (PDCCH). In exemplary communication systems such as 4G or LTE or 5G or NR systems, the PDCCH is used to carry downlink control information such as downlink scheduling assignments and uplink scheduling grants.

In certain aspects, the false base station may transmit signals and/or channels and/or messages that are not transmitted by the legitimate BS. A false base station may transmit control channels (e.g. PDCCH) that do not correspond to an intended control channel transmission from a legitimate base station. Examples of this include a delayed repeater. The false base station may modify the content of signals and/or channels and/or messages that are transmitted by the legitimate BS.

The false base station may also selectively drop important signals and/or channels and/or messages (e.g., page messages) that are transmitted by the legitimate BS. A false base station may selectively drop certain control channel (e.g. PDCCH) transmissions from a legitimate base station.

In some cases, the false base station may intercept (e.g., eavesdrop on) the signals and/or channels from the legitimate BS. When the false base station intercepts signals and/or channels from the legitimate BS, the false base station can extract information from these signals and/or channels. With the extracted information, the false base station can generate and broadcast a reference signal to the UE to lure a UE to camp on the false base station. Once the UE synchronizes with the BS, the UE can send other signals, channels and messages that would normally be transmitted by the legitimate BS using the extracted information. In examples, a false base station may introduce at least one symbol extra timing advance. In examples, a false base station may rely on a UE to be synced to a false base station on a downlink and overwhelm signals from the legitimate base station.

In examples, a false base station may not intercept or decode signals and/or channels from the legitimate BS but may independently, occasionally transmit signals e.g., PDCCH, in an attempt to overwhelm signals (e.g., PDCCH) from a legitimate base station. In some cases, a false base station may transmit PDCCH signals at a higher power than PDCCH signals transmitted from a legitimate base station.

In aspects, a control channel (e.g., PDCCH or PDSCH) may not be secured e.g. may not be ciphered or integrity protected, and may thus be vulnerable to attacks by a false base station. In some examples, if a PDCCH is not secure, a false base station may modify a legitimate PDCCH or inject a false PDCCH or replace a legitimate PDCCH with an imposter PDCCH transmission to the UE. A UE upon decoding a compromised or altered or imposter PDCCH acts upon information that's been conveyed in that transmission.

Figure 5:
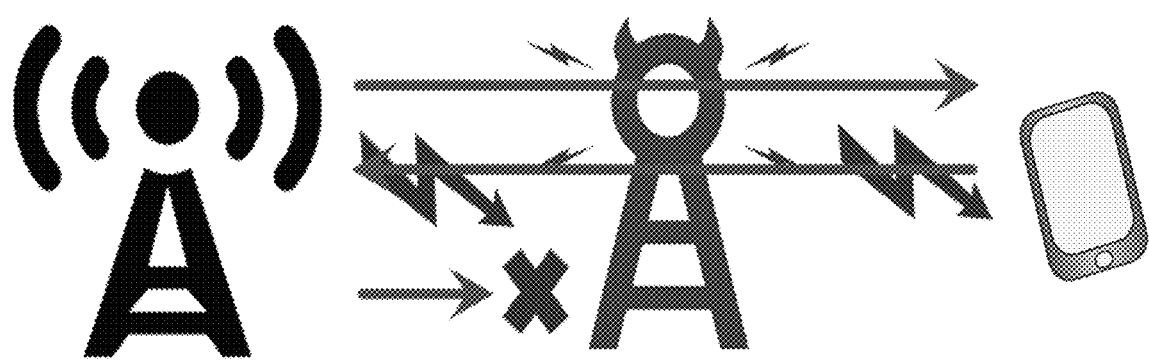
FIG. 5 illustrates example operations of a false (imposter) base station.

As illustrated in FIG. 5, a false base station may act as a selective repeater. Thus, a false base station may sit between a legitimate cell or base station and a UE, the false base station may transmit sync signals to make a UE synchronize to the timing of the selective repeater, or the false base station may decode transmissions of a legitimate base station or cell and selectively drop packets. In some cases, a false base station may listen in on legitimate transmissions to the UE and relay those transmissions to the UE causing no harm to the UE. In some cases, a false base station my drop some or selected PDCCH transmissions to the UE causing harm to the UE. Alternatively, a false base station may intercept legitimate PDCCH transmissions and choose not to relay those transmissions causing harm to the UE. Alternatively, a standalone false base station may transmit sync signals and system information (SI) to make a UE synchronize to the timing of and camp on the false base station. Here, once a UE camps on the false base station, the false base station may determine not to send paging messages to the UE.

In aspects of disclosed examples, in exemplary communication systems (e.g. 4G or LTE or 5G or NR systems), a UE in idle mode synchronizes to a reference signal from a base station and there is no active data transaction. A UE idle camping may camp on a cell, ready to initiate a potential dedicated service or receive an ongoing broadcast service. In this state as well, there are no active data transactions. In this mode, a false base station may intercept paging messages to the UE or may not transmit paging messages to the UE and thus a UE may not receive mobile terminated (MT) calls intended for the UE.

Radio Network Temporary Identifier (RNTI) may be used to identify information dedicated to a particular subscriber on a radio interface such as a 4G or LTE or NR or 5G, etc interface. RNTI may be used to identify and differentiate a connected UE in a cell, a specific radio channel, a group of UEs in the case of paging, a group of UEs for which power control is used by the eNB, system information transmitted for all UEs by a 5G gNB, etc.

UEs in idle mode may monitor PDCCH for a paging RNTI (P-RNTI) which is used for a paging message. If a UE in idle mode detects P-RNTI when it wakes up, it will process the corresponding downlink paging message transmitted on the paging channel. In other words, P-RNTI may be used to notify the UEs that there is an incoming call. In some scenarios, if a false base station intercepts and drops PDCCH transmissions on a P-RNTI identity, then UEs that have synchronized themselves to the false base station will not receive any MT calls.

Cell-RNTI (C-RNTI) is unique to a UE in a cell. The C-RNTI identity is used to transmit PDCCH control information to a UE. In some examples, a false base station may selectively drop transmissions addressed on C-RNTI causing there to be a loss of data. In examples, a false base station may decide to drop all PDCCH transmissions on C-RNTI, resulting in a complete denial of data exchange with the UE. Disclosed examples provide methods and apparatus for estimating performance of radio links in wireless communication systems.

Figure 6A:
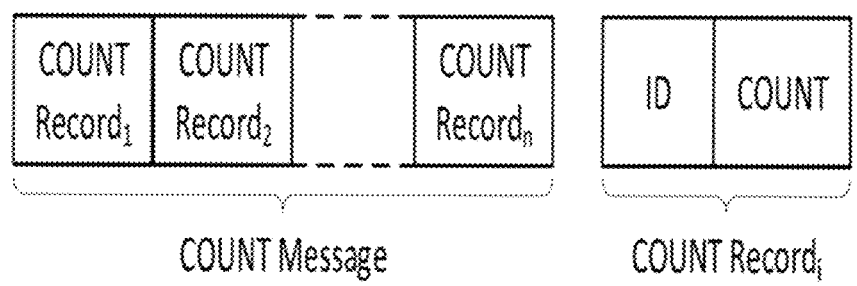
FIGS. 6A and 6B illustrate example operations for wireless communications in accordance with certain aspects of the present disclosure.

In examples, historical information may be transmitted to one or more UEs in a cell. Examples of historical information include COUNT messages. As illustrated in FIG. 6A, a COUNT message may comprise zero or more COUNT records. Each COUNT record may correspond to particular UEs which were paged within previous "N" cycles for which a base station or gNB did not receive a response. A COUNT record within each COUNT message may comprise a COUNT ID and a COUNT. As used herein, COUNT ID may refer to an identity associated with a UE. For instance COUNT ID may refer to a paging UE identity such as ng-5G-S-TMSI or full I-RNTI. COUNT in a COUNT record may refer to a number of times a UE was paged, or a number of times a corresponding ID was paged in previous "N" paging cycles.

In aspects of disclosed examples, one bit in PDCCH downlink control information (DCI) may be used to indicate an empty COUNT message or that there is no associated PDSCH. In an aspect of disclosed examples, DCI provides the UE with information such as physical layer resource allocation, power control commands, HARQ information, etc for uplink and downlink.

In examples, if a UE receives a COUNT message with an unexpected value, the UE may determine transmissions from a legitimate BS have been, or are being compromised or interferred with. For instance, a UE may compare the number of pages received in a COUNT message to a known value and if there is a difference between the number of pages received and the known value, the UE may determine transmissions from a legitimate BS have been, or are being compromised or interferred with. Here, the known value may be a number of expected pages (based on UEs own count). In this case, if there is a difference between a COUNT value received in a COUNT message and the UE's own count, then the UE may determine transmissions to the UE from a legitimate BS have been, or are being compromised or interferred with e.g. dropped or diverted by a false base station.

In examples, a UE may expect to receive one COUNT message using PDCCH or PDSCH with COUNT-RNTI every "N" paging cycles. In aspects, a determination of the value of "N" may be made based on a trade off between COUNTING overhead and latency of detection. For instance, a smaller "N" may correspond to a higher COUNTING overhead and low detection latency, whereas a higher "N" may correspond to a lower COUNTING overhead and higher detection of latency.

In aspects, if a UE fails to receive an expected COUNT message, the UE determines transmissions from a legitimate BS have been, or are being compromised or interferred with. In aspects, if a UE fails to receive an expected COUNT message, the UE determines it is communicating with an attacker or imposter or false base station. Thus, a UE may declare a miscounting event if no COUNT message is received. A UE may declare a miscounting event if the number or pages received is not equal to a COUNT corresponding to the UEs ID if present.

In examples, a UE may declare the presence of an attacker or imposter or false base station, etc upon observing "n" miscounting events in a moving window of "t" COUNTING cycles.

In examples, historical information may refer to a number of times a legitimate BS has paged a UE in previous or recent history. In examples, a UE may receive information indicating the number of times a legitimate BS has paged the UE in previous or recent history and compare this information to the UE's observation of the number of times it has actually been paged. Here, if there is a mismatch or difference in value, the UE may determine transmissions to the UE from a legitimate BS have been, or are being compromised or interferred with e.g. dropped or diverted by a false base station.

In aspects of disclosed examples, historical information may be a secure message. In other words, historical information may be secured e.g., using a cryptographic primitive such as integrity protection. In aspects, by virtue of being secure, historical information may not be generated by a false base station.

Figure 6B:
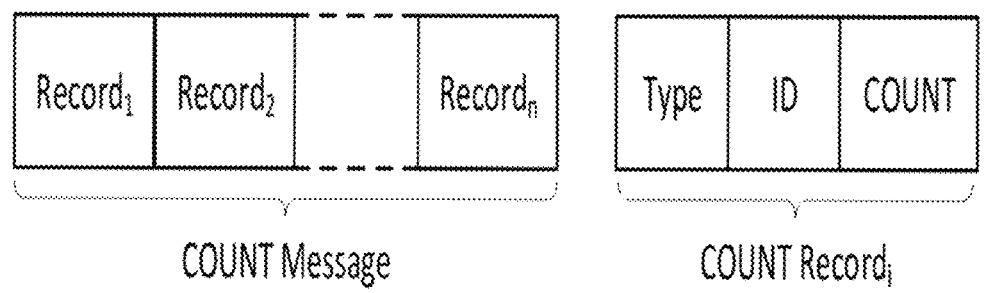

In some examples, a page COUNTING scheme may be generalized to account for C-RNTI. As illustrated in FIG. 6B, a COUNT message may include zero or more COUNT records corresponding to UEs which were paged or scheduled on C-RNTI within previous "N" cycles but for which a base station or gNB did not receive a matching page response or HARQ ACK(s). A COUNT record of a COUNT message may include a Type field, an ID field and a COUNT field. As used herein, Type may refer to an indication of paging or C-RNTI record. In other words, Type field may indicate whether the count record corresponds to a P-RNTI type of counting or a C-RNTI type of counting. ID may refer to a paging UE identity or C-RNTI. COUNT may refer to the number of times a corresponding ID was paged or scheduled on C-RNTI in "N" previous paging cycles. In aspects of disclosed examples, a cycle may have a periodicity that is not necessarily a multiple of a paging cycle.

In examples, a UE may expect to receive one COUNT message on PDCCH or PDSCH using COUNT-RNTI every "N" paging cycles. In aspects, this may require CONNECTED mode UEs to monitor COUNT-RNTI every "N" paging cycles.

In disclosed examples, if the COUNT record Type is indicated as C-RNTI counting, then a UE may compare the COUNT value in the COUNT record to the number of times the UE was scheduled on C-RNTI. A mismatch or significant mismatch between the compared values may indicate to the UE the presence of a false base station, or that transmissions to the UE from a legitimate BS have been, or are being compromised or interferred with e.g. dropped or diverted by a false base station or that the UE is under attack by a false base station. In some examples, a one percent misdetection on PDCCH for C-RNTI may be expected. Thus, a mismatch greater than five percent may be considered a significant mismatch. In some examples, other values less than or greater than five percent may be considered a significant mismatch.

In aspects, a UE may declare a miscounting event if a COUNT message is not received. A UE may declare a miscounting event if the number or C-RNTI or pages received is not equal to a COUNT corresponding to the UE ID if present. In examples, a UE may declare an attacker or false (imposter) base station is detected upon observing "n" miscounting events in a moving window of "t" counting cycles.

In disclosed examples, the COUNT record Type may correspond to a paging type of counting, e.g., P-RNTI. As previously discussed, if a UE fails to receive an expected COUNT message, the UE may determine transmissions from a legitimate BS have been, or are being compromised or interferred with. In examples, if a UE receives a COUNT message with an unexpected value, the UE may determine transmissions from a legitimate BS have been, or are being compromised or interferred with.

Figure 7:
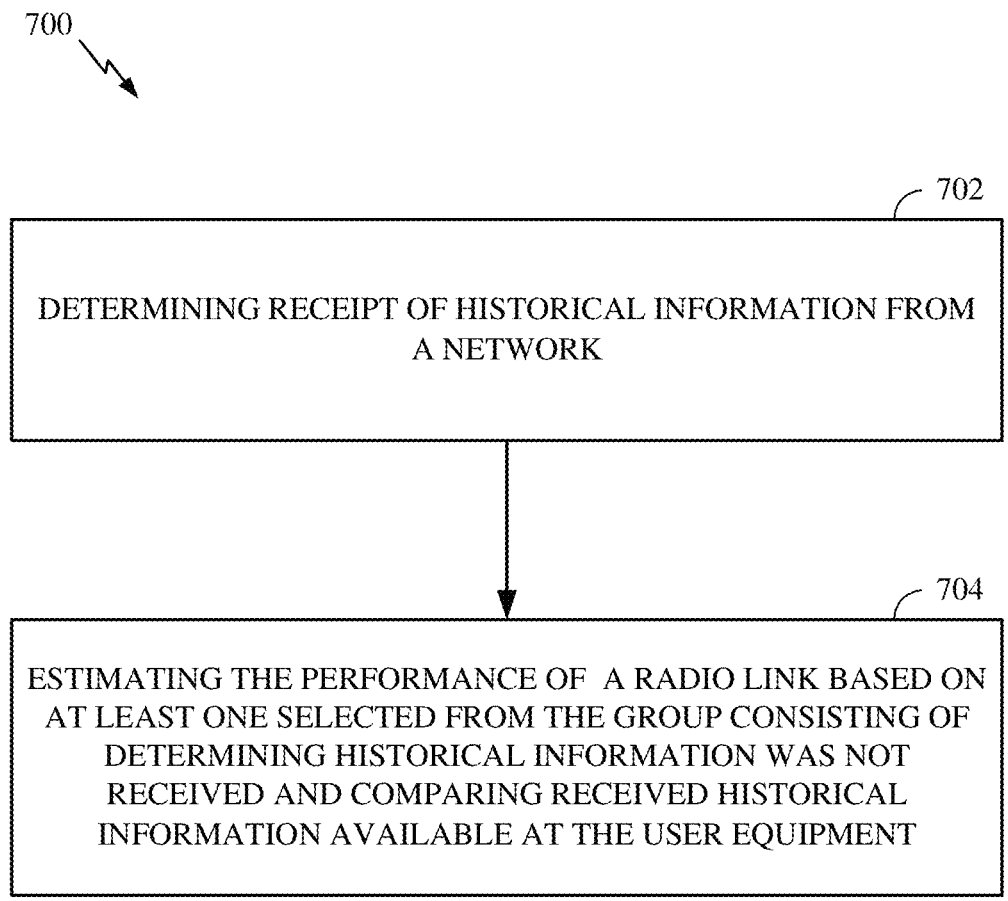
FIG. 7 illustrates example operations for wireless communication by a node, in accordance with certain aspects of the present disclosure.

FIG. 7 illustrates example operations 700 that may be performed by a node as part of a false base station detection procedure, in accordance with certain aspects of the present disclosure. Operations 700 may be performed, for example, by a node, such as a UE 120 shown in FIG. 1 (or one or more of the processors thereof shown in FIG. 2) or a BS 110 shown in FIG. 1. As described above, the signals and/or channels transmitted and received by the UE, the legitimate BS, and the false base station may include messages to be decoded.

Operations 700 begin, at 702, by determining receipt of historical information from a network. At 504, the node estimates the performance of a radio link based on at least one selected from the group consisting of determining historical information was not received and comparing received historical information available at a UE.

In some cases, the node may determine the historical information comprises an indication of a number of times the UE was paged in a previous timeframe as compared to a number of times the UE received a page in the timeframe.

Figure 8:
FIG. 8 illustrates example operations for wireless communication by a network entity, in accordance with certain aspects of the present disclosure.
Figure 8:

FIG. 8 illustrates example operations 800 that may be performed by a network entity as part of a procedure for detecting false base station transmissions, in accordance with certain aspects of the present disclosure. Operations 800 may be performed by a BS such as the BS 110 (or one or more of the processors thereof shown in FIG. 2) described above.

Operations 800 begin, at 802, by transmitting historical information, wherein the historical information is associated with estimating the performance of a radio link by a UE and the historical information corresponds to an indication of information associated with the UE.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Means for receiving or means for obtaining may include a receiver (such as the receive processor 338) or an antenna(s) 334 of the access point 110 or the receive processor 358 or antenna(s) 352 of the station 120 illustrated in FIG. 3. Means for transmitting or means for outputting may include a transmitter (such as the transmit processor 320) or an antenna(s) 334 of the access point 110 or the transmit processor 364 or antenna(s) 352 of the station 120 illustrated in FIG. 3. Means for associating, means for determining, means for monitoring, means for deciding, means for providing, means for detecting, means for performing, and/or means for setting may include a processing system, which may include one or more processors, such as the receive processor 338/358, the transmit processor 320/364, the TX MIMO processor 330/366, or the controller 340/380 of the access point 110 and station 120 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving a signal from a base station, the signal comprising one or more of a synchronization signal, a reference signal, or system information;

synchronizing a communication timing of the UE with a timing of the base station based on receiving the signal;

determining receipt, from a network during a subsequent COUNTING cycle, of historical information associated with a COUNTING cycle, the historical information comprising an indication of a first quantity of paging messages transmitted to the UE for which a response was not received, wherein the UE expects to receive a transmission of historical information according to a periodicity that is based on a plurality of paging messages from the network;

estimating a performance of a radio link by detecting whether the base station is a false base station based on at least one of:

determining historical information was not received, or comparing the first quantity of paging messages to a second quantity of paging messages received at the UE; and declaring a miscounting event based on estimating the performance of the radio link.

2. The method of claim 1, wherein the COUNTING cycle corresponds to a previous cycle of a periodic cycle of receiving historical information by the UE.

3. The method of claim 1, wherein the COUNTING cycle corresponds to an elapsed time since a last reception of historical information.

4. The method of claim 1, wherein the historical information corresponds to a point in time the UE was last paged within the COUNTING cycle as compared to a last point in time the UE received a page in the COUNTING cycle.

5. The method of claim 4, wherein the COUNTING cycle corresponds to a fixed duration of time ending at a time of reception of the historical information.

6. The method of claim 1, wherein the historical information indicates a number of times the UE was scheduled on a Physical Downlink Control Channel (PDCCH) using its Cell-Radio Network Temporary Identifier (C-RNTI) in a previous timeframe as compared to the number of times the UE received PDCCH using its C-RNTI in a timeframe.

7. The method of claim 6, wherein the timeframe corresponds to a previous cycle of a periodic cycle of receiving the historical information.

8. The method of claim 6, wherein the timeframe corresponds to an elapsed time since a last reception of the historical information.

9. The method of claim 1, wherein the historical information indicates a point in time the UE was last scheduled on a Physical Downlink Control Channel (PDCCH) using its Cell-Radio Network Temporary Identifier (C-RNTI) within a timeframe as compared to a last point in time the UE received PDCCH using its C-RNTI in the timeframe.

10. The method of claim 9, wherein the timeframe corresponds to a fixed duration of time ending at a time of reception of the historical information.

11. The method of claim 1, wherein the historical information is received using an identity common to a group of UEs in a cell.

12. The method of claim 1, wherein the historical information is transmitted via a COUNT message.

13. The method of claim 12, wherein the COUNT message contains zero or more COUNT records and each COUNT record includes a "Type" Identifier field, wherein the "Type" Identifier field comprises an indication that the type of COUNT record is at least one selected from the group consisting of a paging COUNT record and a scheduling COUNT record, and the COUNT record also includes a UE ID and a COUNT, wherein the COUNT comprises an indication of a number of times the corresponding UE was paged or scheduled in the COUNTING cycle.

14. The method of claim 13, wherein the COUNT in the paging COUNT record corresponds to a number of times the UE was scheduled on a Physical Downlink Control Channel (PDCCH) using a Paging-Radio Network Temporary Identifier (P-RNTI).

15. The method of claim 13, wherein the COUNT in the scheduling COUNT record corresponds to a number of times the UE was scheduled on a Physical Downlink Control Channel (PDCCH) using Cell-Radio Network Temporary Identifier (C-RNTI).

16. The method of claim 1, wherein the COUNTING cycle is an integer multiple of the UE's paging cycle.

17. The method of claim 13, wherein the COUNT message received on PDCCH and PDSCH is associated with an identity "COUNT-RNTI" common to a group of UEs.

18. The method of claim 13, wherein the COUNT message containing zero COUNT records is indicated by means of a Downlink Control Information (DCI) contained within a Physical Downlink Control Channel (PDCCH) scheduled on a COUNT Radio Network Temporary Identifier (COUNT-RNTI).

19. The method of claim 13, wherein the COUNT message is ciphered, integrity protected, or both.

20. The method of claim 13, wherein the scheduling COUNT record for the UE is ciphered, integrity protected, or both, based at least in part on a Cell-Radio Network Temporary Identifier (C-RNTI).

21. A method for wireless communications by a network entity, comprising:

transmitting a signal to a user equipment (UE), the signal comprising one or more of a synchronization signal, a reference signal, or system information;

transmitting a first quantity of paging messages to the UE during a COUNTING cycle; and transmitting, during a subsequent COUNTING cycle, historical information associated with the COUNTING cycle, wherein the historical information is associated with estimating, by the UE, a performance of a radio link by detecting a false base station, the historical information comprising an indication of a second quantity of paging messages transmitted to the UE for which a response was not received, wherein the UE is configured to expect to receive a transmission of historical information according to a periodicity that is based on a plurality of paging messages from the network.

22. The method of claim 21, wherein the COUNTING cycle corresponds to a previous cycle of transmissions of the historical information.

23. The method of claim 21, wherein the COUNTING cycle corresponds to an elapsed time since a last transmission of the historical information.

24. The method of claim 21, wherein the historical information comprises an indication of a point in time the UE was last paged within a previous COUNTING cycle.

25. The method of claim 24, wherein the COUNTING cycle is a fixed duration of time ending at a time of transmission of the historical information.

26. The method of claim 21, wherein the historical information comprises an indication of a number of times the UE was scheduled on a Physical Downlink Control Channel (PDCCH) using its Cell-Radio Network Temporary Identifier (C-RNTI) in a previous timeframe.

27. The method of claim 26, wherein the timeframe corresponds to a previous cycle of a periodic cycle of transmitting the historical information.

28. The method of claim 27, wherein the timeframe corresponds to an elapsed time since a last transmission of the historical information.

29. The method of claim 21, wherein the historical information comprises an indication of a point in time the UE was last scheduled on a Physical Downlink Control Channel (PDCCH) using its Cell-Radio Network Temporary Identifier (C-RNTI) within a timeframe.

30. The method of claim 29, wherein the timeframe is a fixed duration of time ending at a time of transmission of the historical information.

31. The method of claim 29, wherein the historical information is transmitted using an identity common to a group of UEs in a cell.

32. The method of claim 21, wherein the historical information is transmitted via a COUNT message.

33. The method of claim 32, wherein the COUNT message contains zero or more COUNT records and each COUNT record includes a "Type" Identifier field, wherein the "Type" Identifier field comprises an indication that the type of COUNT record is at least one selected from the group consisting of a paging COUNT record and a scheduling COUNT record, and the COUNT record also includes a UE ID and a COUNT, wherein the COUNT comprises an indication of a number of times the corresponding UE was paged or scheduled in the COUNTING cycle.

34. The method of claim 33, wherein the COUNT in the paging COUNT record corresponds to a number of times the UE was scheduled on a Physical Downlink Control Channel (PDCCH) using a Paging-Radio Network Temporary Identifier (P-RNTI).

35. The method of claim 33, wherein the COUNT in the scheduling COUNT record corresponds to a number of times the UE was scheduled on a Physical Downlink Control Channel (PDCCH) using Cell-Radio Network Temporary Identifier (C-RNTI).

36. The method of claim 21, wherein the COUNTING cycle is an integer multiple of the UE's paging cycle.

37. The method of claim 33, wherein the COUNT message is transmitted on PDCCH and PDSCH using a COUNT-RNTI common to a group of UEs.

38. The method of claim 33, wherein the COUNT message contains zero COUNT records indicated by a Downlink Control Information (DCI) contained within a Physical Downlink Control Channel (PDCCH) scheduled on a COUNT Radio Network Temporary Identifier (COUNT-RNTI).

39. The method of claim 33, further comprising including a paging COUNT record in the COUNT message only for UEs from which a paging response was not received in response to paging the UE.

40. The method of claim 33, further comprising including a scheduling COUNT record in the COUNT message only for UEs from which a HARQ ACK was not received in response to scheduling the UE.

41. The method of claim 33, wherein the COUNT message is ciphered, integrity protected or both.

42. The method of claim 33, wherein the scheduling COUNT record for the UE is ciphered, integrity protected, or both, based at least in part on a Cell-Radio Network Temporary Identifier (C-RNTI).

* * * * *